UNITED STATES PATENT OFFICE.

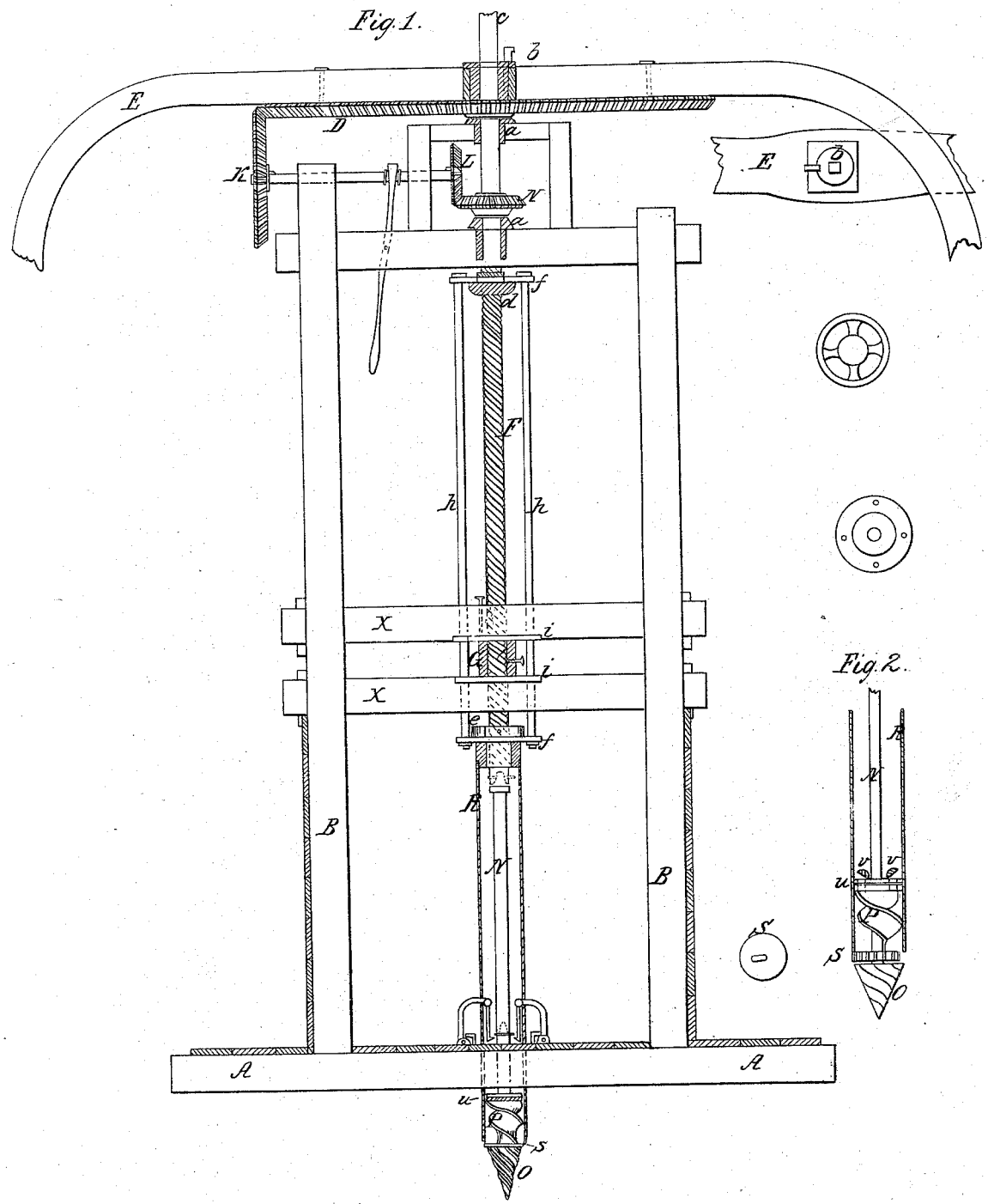

CLARENDON WILLIAMS, OF FRANKLIN, MISSOURI.

APPARATUS FOR BORING ARTESIAN WELLS.

Specification of Letters Patent No. 15,587, dated August 19, 1856.

*To all whom it may concern:*

Be it known that I, CLARENDON WILLIAMS, of Franklin, in the county of Franklin and State of Missouri, have invented certain new and useful Improvements in the Sinking of Artesian Wells; and I do hereby declare that the following is a full, clear, and exact description of the same, reference being had to the accompanying drawings, making a part of this specification.

The improvement consists of certain mechanical contrivances that possess the property of drilling in rock, and yet are well adapted to boring in the earth and causing the descent of a tube (at the same time) by which the opening is preserved.

To enable others skilled in the art to make and use my invention, the following description will suffice.

After having prepared a sufficiently large pit in the earth, a platform A, suitably framed together is placed therein; two uprights B B of a frame are raised and secured to the platform or base A; planking is secured to the outside of the uprights and with end pieces form a box of sufficient size to admit of the operations hereafter to be described. The earth is now thrown outside of the box and on the platform, thus loading it and making the uprights firm and steady.

I will first describe the machine as employed for boring in rock.

C, is a square metallic shaft provided with boxes or journals $a$ $a$ of a circular form on their periphery, to admit of being revolved.

D is a crown wheel through which the shaft passes by means of a sleeve ($b$,) that admits of keying for purposes hereafter to be explained.

E is a sweep bolted on the crown wheel, to which horses may be attached. ($d$) is a flanged hub on the lower end of the square shaft uniting it to the screw bar F; near the lower end of F is hub ($e$) secured like ($d$) to the screw bar.

($f$ $f$,) are plates fitting on the hubs. ($h$ $h$) are guide bars extending from plate to plate and passing through the cross pieces ($x$, $x$,) of the framing, giving direction and steadiness to the auger and shafting.

G, is a female screw or nut, placed on the screw bar F, between plates ($i$, $i$); this nut may be secured by a set screw to the shaft and turn therewith, thus preventing the farther descent of the auger and shaft until the rock is reduced; then by releasing the nut from the shaft and fastening it between the plates ($i$ $i$) the screw will feed the auger the desired distance, when it may be again suspended by the set screw. In penetrating ordinary earth, the screw F, may be allowed to feed through the fixed nut.

Figure 2 exhibits the drill and auger as separated from the machine. It consists of a conical piece of steel ($o$) having spiral cutting edges on its surface. It is united to the lower end of the auger shaft N and turns with it. Above the cone is a steel plate S having its periphery furnished with saw teeth or cutting edges. Instead of being secured to the shaft by a central hole, it has a slot or oblong opening, so as to admit of its revolution as an eccentric, and thus ream or cut a hole in the rock of a larger diameter than its own, to allow of the introduction of the tube R, for sustaining the sides of the opening or well.

(P,) is a spiral flange or screw of the auger; ($u$), a piston formed of two plates of metal with leather interposed of sufficient size to fit the tube and make it watertight if requisite; in the piston are two holes ($v$, $v$) provided with flaps or valves.

It remains now to describe the object of the crown wheel arrangement on a sleeve. N is a bevel wheel revolving with the square shaft; L, a pinion meshing with N. K is a larger bevel wheel on the shaft of N; it meshes with and is driven by the crown wheel D. When the key securing the sleeve in said wheel is withdrawn, and the pinion thrown into mesh with N, then the auger and shafting may be thus revolved with more rapidity than the sweep is turned; this may be necessary in withdrawing or inserting the auger.

The tubing R is forced into and follows the opening made by the cone $o$ and reamer plate $s$, by a shoulder on the lower hub ($e$), and thus by the operation of the screw F the earth is perforated and the tube forced down.

The mode of joining the tubes and the shafts of the auger need not be described.

The importance of this invention will be appreciated not only for sinking Artesian wells but in prospecting for minerals or other examination of the interior of the earth.

Having described my improvements what I claim as my invention and desire to secure by Letters Patent is—

The boring of earth and stone and sinking of tubing at one operation forming Artesian wells, by the mechanism employed consisting of screw F and nut G, arranged and operating in the manner described with the auger, constructed substantially and operated in the manner set forth.

In testimony whereof I have signed my name before two subscribing witnesses.

CLARENDON WILLIAMS.

Witnesses:
J. ATTICUS ROBERTSON,
A. GOSSCUP.